United States Patent Office 3,510,279
Patented May 5, 1970

---

3,510,279
SELF-LUBRICATING SURFACE LAYER ON METAL PART SUBJECT TO FRICTION
John Birger Burman, Linkoping, Sweden, assignor to Saab Aktiebolag, Linkoping, Sweden, a corporation of Sweden
No Drawing. Filed July 10, 1967, Ser. No. 652,030
Claims priority, application Sweden, July 26, 1966, 10,149/66
Int. Cl. B32b *15/04*
U.S. Cl. 29—195
3 Claims

ABSTRACT OF THE DISCLOSURE

One of a pair of metal parts that are to be subjected to sliding or rubbing contact with one another is first electroplated with a layer of silver having a depth of 5 to 10 micro-meters, and the silver is then sulphured to a depth of 1 to 2 micro-meters to provide a silver sulphide self-lubricating surface layer. Sulphiding is preferably accomplished by activating the silver with 10% $H_2O_2$ for 15 to 30 seconds, then, without rinsing, exposing for about 10 minutes to a 10% solution of $(NH_4)_2S$ at room temperature. Fretting corrosion is prevented where the metal parts are connected in fixed relation to one another.

---

This invention relates to metal parts that are subjected to friction in an assembly, and refers more particularly to metal parts having a self-lubricating surface.

There are many mechanical constructions comprising metal parts that are subject to friction due to rolling or sliding engagement between them. The problem of such friction is well recognized in connection with bearings, journals and the like, but it also exists with parts that are relatively rigidly connected to one another, as by means of bolts, rivets, pins and the like, and which are subject to vibrations and elastic deformations.

Although the relative motion between such relatively rigidly connected parts is, as a rule, very small, it can nevertheless be sufficient to produce a considerable friction between the parts at their contacting areas. Such friction gives rise to so-called fretting corrosion, which is recognizable as surface damage that often increases rapidly. Fretting corrosion impairs the strength of the affected part at the zone of its frictional contact and contributes to the initiation of fatigue cracks in the material. It can therefore lead to a sudden break in the assembly at or near the connection at which the fretting corrosion occurs.

The problem of fretting corrosion is therefore a serious one in the aircraft industry and in other fields where integrity and reliability must be insured for structures that are subjected to vibration or to large, rapidly changing stresses.

One solution to the problem of fretting corrosion heretofore employed in cases where conventional lubricants could not be applied to the friction producing parts for one reason or another has been the use of metal sulphides on the frictional surfaces. Molybdenum sulphide has been mainly used, and has been applied by rubbing it onto the frictional surfaces. However, to obtain the desired adhesion of the molybdenum sulphide to the parts, it has been necessary to rub it on very carefully, and the application was difficult to make and time consuming, especially when the friction surface was relatively inaccessible.

The use of molybdenum sulphide has therefore been confined mainly to bearing surfaces for the purpose of preventing seizing. While its use on rubbing surfaces to prevent fretting corrosion is not unknown, such use is by no means widespread, not only because of the time and trouble which it requires but also because the protection it affords is comparatively short-lived.

Another expedient sometimes employed for the prevention of fretting corrosion has been the use of a so-called dry film lubricant consisting of epoxy resin to which molybdenum sulphide has been added. The dry film lubricant was not particularly difficult to apply, but it had a tendency to be scraped off of parts that fitted into one another with small tolerances, had a low temperature limit (about 200° C.) and had a low bearing strength.

By contrast, the present invention has for its object the provision of a self-lubricating part.

More specifically, it is a general object of the present invention to provide a self-lubricating surface that is inexpensive, extremely durable, and reliable, for a metal part that is subject to fretting corrosion or to rolling or sliding friction.

With the above and other objects in view which will appear as the description proceeds, this invention resides in a novel structure substantially as hereinafter described and more particularly defined by the appended claims, it being understood that such changes in the precise embodiment of the herein disclosed invention may be made as come within the scope of the claims.

According to the present invention, one of a pair of metal parts that are to be subjected to frictional engagement with one another has its surface to be subjected to such friction electrolytically plated with silver, and the silver of the plating is thereafter sulphured to convert it to silver sulphide to a predetermined depth.

Specifically, the metallic surface of the part to be treated is first electrolytically coated with silver to a thickness of about 5 to 10 micro-meters. The procedure for such silver plating is of course so well known as not to require description here.

Then the layer of silver is sulphured to a depth of 1 to 2 micro-meters to convert it to silver sulphide. Such sulphuring can be carried out either electrolytically or by a wet chemical process.

Electrolytic sulphuring of the silver coating can be accomplished in a bath consisting of 4 gms. per liter of sodium sulphide, with an addition of 5 milliliters per liter of an active wetting agent such as "Teepol." The current density in the bath is held at a value of 0.1 to 0.2 amperes per square decimeter, the time of treatment is about 10 minutes, and the bath temperature is about 20° C.

With electrolytic sulphuring as just described, it is necessary to hold the current density within narrow limits at all surfaces of the part that is to be treated, and this requires that the shape and location of the electrodes be accommodated to the part to be treated. For irregularly shaped parts, and even for many parts that are of uncomplicated shape, the wet chemical procedure for sulphuring is therefore preferred.

In this, the layer of silver is first activated by exposure in about a 10% concentration of hydrogen peroxide for a period of about 15 to 30 seconds. Then, without rinsing, the activated silver is treated for about 10 minutes in a solution of about 10% ammonium sulphide, preferably at normal room temperature.

With the last described sulphuring procedure the sulphide layer that is obtained is of uniform thickness on all silver plated surfaces of the article to be treated.

From the foregoing description it will be apparent that this invention provides an inexpensive method of producing a self-lubricating surface on a metal part that is intended to have rubbing or rolling frictional engagement with another, and also provides a metal part having a very durable and effective dry lubricating surface.

From tests, it has been found that metallic friction surfaces on roller and slide bearings treated according to this invention have good lubricating action in sliding and rolling contact with other parts made of steel, hard chrome and copper base bearing metal.

What is claimed as my invention is:

1. In an assembly which is subjected to repeated bodily stressing, such as vibration, and which comprises a pair of metal parts that are connected in fixed relation to one another, with each having a surface portion engaged with the other, means for preventing fretting corrosion of said parts, comprising:
   a plating of silver on said surface portion of one of the parts, having a sulphided external surface layer.

2. The assembly of claim 1, further characterized by:
   (A) the total thickness of the silver on said surface portion of said part being on the order of 5 to 10 micro-meters; and
   (B) the depth to which the silver is sulphided being on the order of 1 to 2 micro-meters.

3. In an assembly which is subjected to repeated bodily stressing, such as vibration, and which comprises a pair of metal parts that are connected in fixed relation to one another, with each having a surface portion engaged with the other, means for preventing fretting corrosion of said parts comprising:
   a layer of silver sulphide on the surface portion of one of said parts that is engaged with the other.

References Cited

UNITED STATES PATENTS

| 2,420,886 | 5/1947 | Laffoon | 204—37 |
| 2,428,036 | 9/1947 | Peters et al. | 117—224 |

OTHER REFERENCES

Cosgrove, S. L., Sibley, L. B., and Allen, C. M.; ASLE (Am. Soc. Lubrication Engrs.) Trans. vol. 2, pp. 217–24 (1960).

Greenhill, E. B.; J. Inst. Petrol., vol. 34, pp. 659–69 (1948).

L. DEWAYNE RUTLEDGE, Primary Examiner

E. L. WEISE, Assistant Examiner

U.S. Cl. X.R.

29—199